United States Patent [19]

Penzotti et al.

[11] 4,276,953
[45] Jul. 7, 1981

[54] SHIFT LINKAGE FOR A TILT CAB TRUCK

[75] Inventors: Roger P. Penzotti, Livermore; Gordon F. Schmeisser, Aptos, both of Calif.

[73] Assignee: Paccar Inc., Bellevue, Wash.

[21] Appl. No.: 115,763

[22] Filed: Jan. 28, 1980

[51] Int. Cl.³ .................... B62D 27/06; B60K 23/00
[52] U.S. Cl. .................... 180/328; 74/473 R; 180/89.14
[58] Field of Search .......... 180/328, 327, 89.14; 74/473 R, 473 P; 296/190

[56] References Cited

U.S. PATENT DOCUMENTS

| | | | |
|---|---|---|---|
| 2,854,088 | 9/1958 | Dence | 180/328 |
| 3,329,229 | 7/1967 | Mukho | 180/89.14 X |
| 3,476,202 | 11/1969 | Dudley | 180/89.14 X |
| 4,104,929 | 8/1978 | Kessmar | 74/473 R |

FOREIGN PATENT DOCUMENTS 1245747  9/1971  United Kingdom .................. 180/89.14

Primary Examiner—Joseph F. Peters, Jr.
Assistant Examiner—Randall A. Schrecengost
Attorney, Agent, or Firm—Owen, Wickersham & Erickson

[57] ABSTRACT

A gearshift linkage for a cab-over-engine type truck having a shift lever extending up through the cab floor enables the forward tilting of the cab on the frame, about the cab pivot axis, without disengagement of the shift linkage and without dislocation of the shift lever from the cab. In the preferred embodiment, a conventional shifter control unit is secured to the cab just below the floor, with the shift lever extending up from the control unit. The control unit is equipped to accept side-to-side movement of the shift lever and translate it into rotation of a control unit output shaft, and to accept forward and rearward movement of the shift lever and translate it into generally forward and rearward movement of the output shaft. The control unit output shaft is connected through a first universal joint to a control shaft which extends forwardly and downwardly from the cab, being connected at its other end to a specially configured universal joint. The special universal joint is at the forward end of a transmission linkage shaft which extends back to the transmission and mounted to the truck frame for both axial sliding movement and rotational movement. The specially configured universal joint is at the apex of a sharply acute angle between the control shaft and the transmission linkage shaft, and is located as close as possible to the cab pivot axis, about which the cab tilts forward on the frame. When the cab is tilted forward on its axis, all of the shift linkage remains connected. The offset of the special joint from the cab pivot axis causes the control shaft to undergo some translation relative to the shifter control unit, causing the shift lever to undergo minor changes of position not detrimental to the operation or to the shift linkage.

11 Claims, 13 Drawing Figures

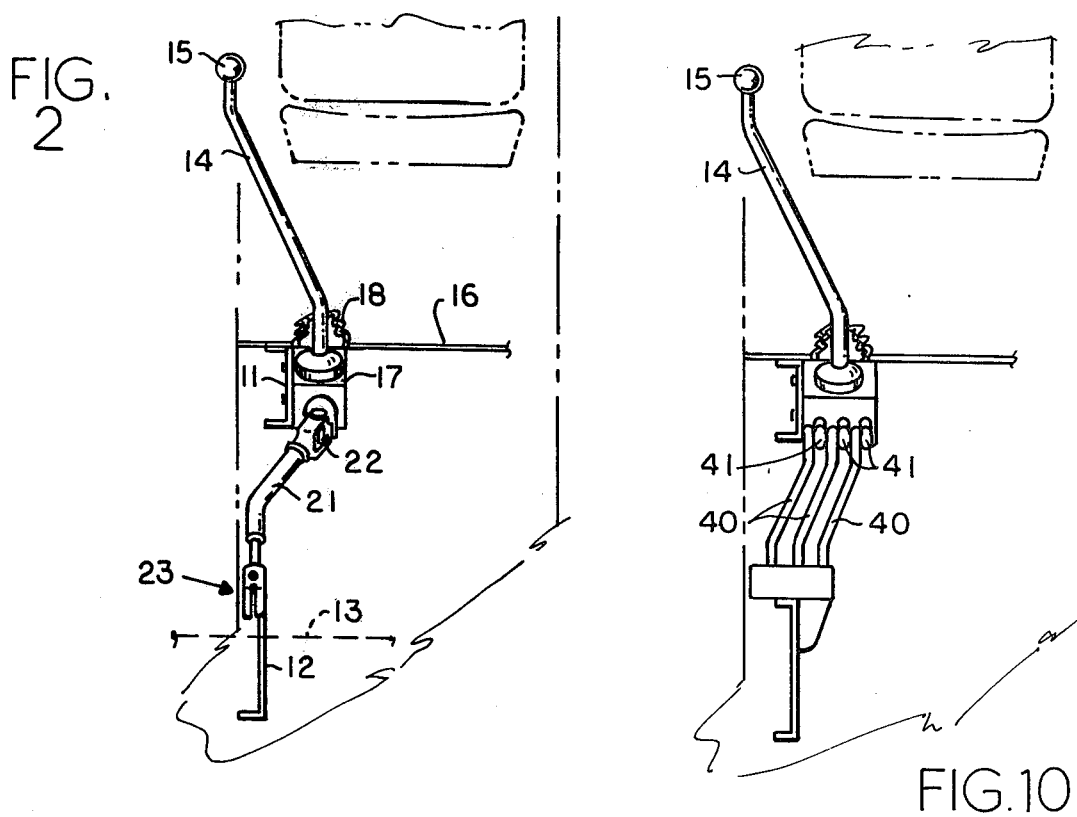
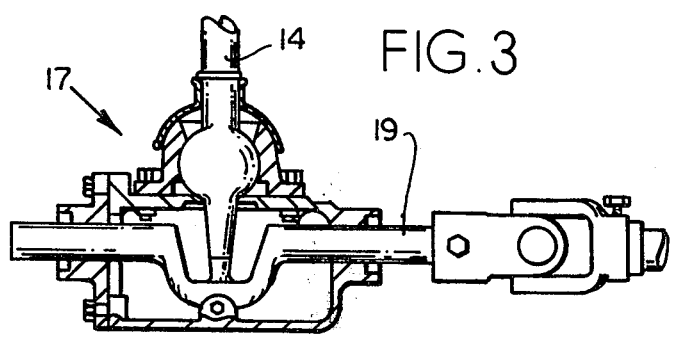
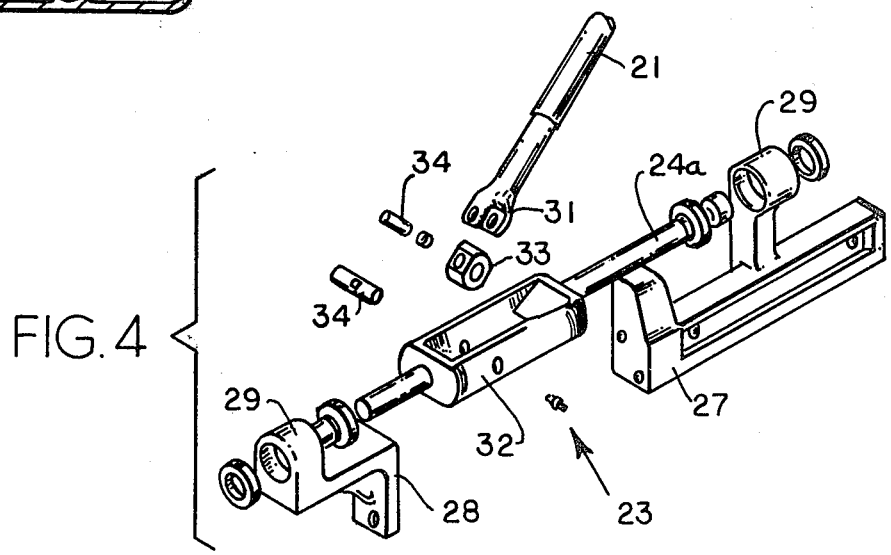

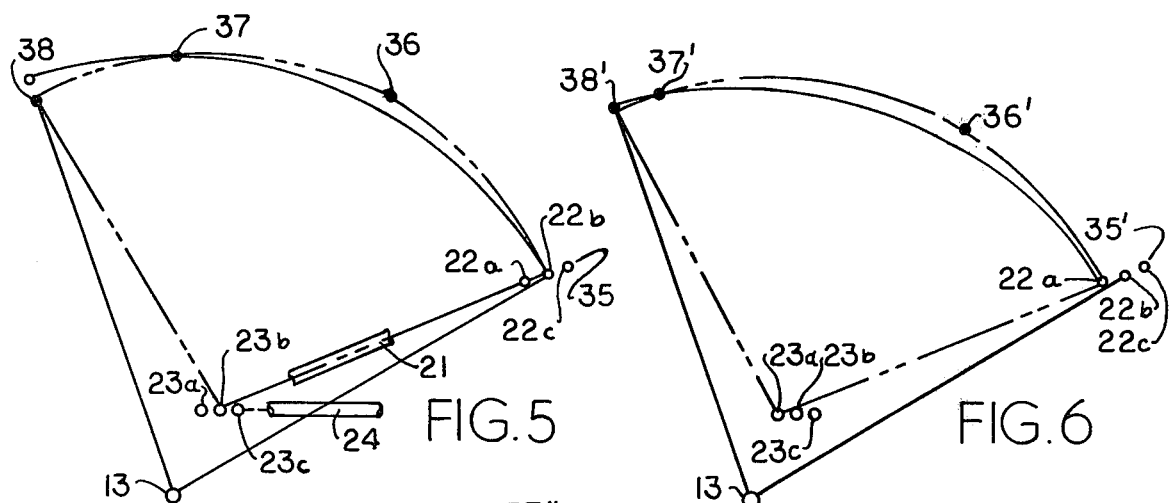
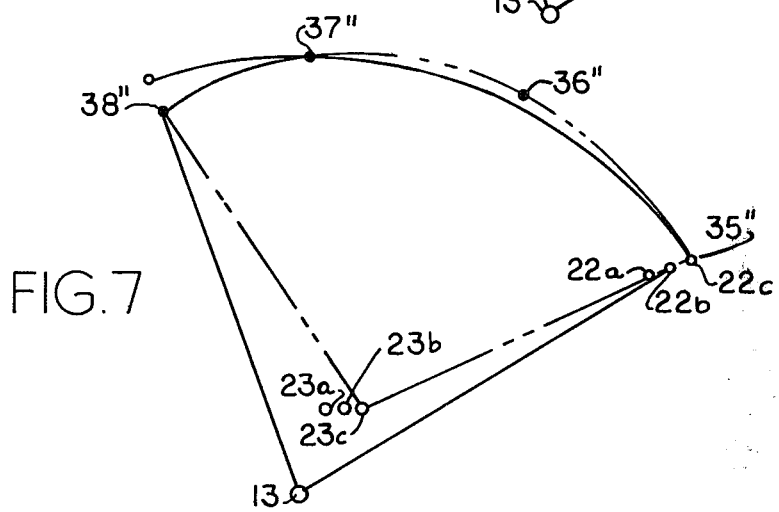
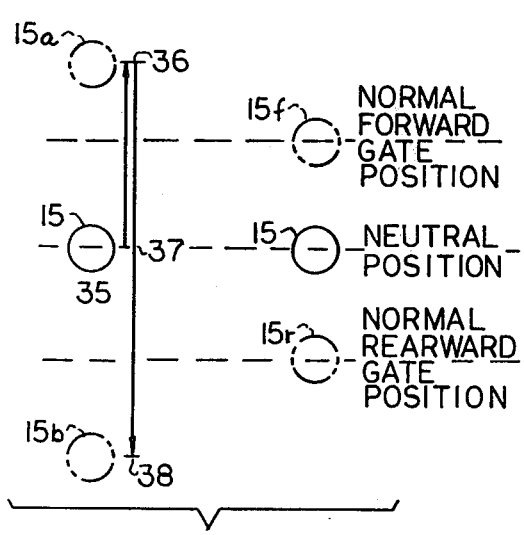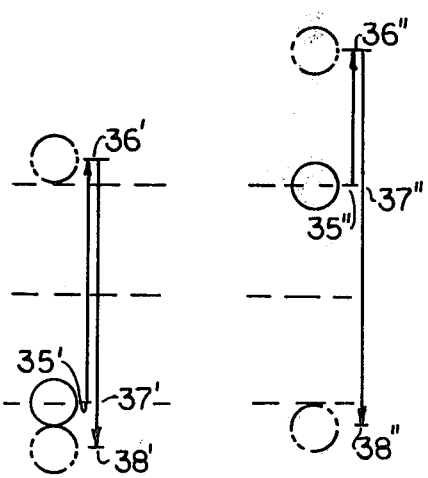

SHIFT LINKAGE FOR A TILT CAB TRUCK

BACKGROUND OF THE INVENTION

The invention relates to gearshift-transmission linkage, and more particularly to a specially designed linkage for tilt-cab vehicles, enabling the linkage to remain fully connected while the cab is tilted forward on the frame for servicing.

Manufacturers of tilt-cab vehicles have had to address the problems that tilting imposes upon the control systems interfacing the cab with the chassis. Steering, shifter, clutch, and throttle linkages must all accommodate the articulation of the cab.

Shifter mechanisms generally pose the most complicated control function. Since a shift pattern is a two-dimensional array of gear positions, two channels of control are required. Cab-over-engine vehicles generally use a control unit that drives a single rod with a linear motion for one channel and a rotary motion for the other channel.

There have been two approaches to this problem. One has been the provision for upward swinging of the cab independent of the shifter, with the gearshift and associated mechanism remaining attached to the frame. By this arrangement, a frame mounted shift tower was provided to support the shifter control unit and a small "subfloor" attached to the control unit and positioned to seal against the underside of the cab floor. A rod and two universal joints connected the control unit directly to the transmission slave unit. When the cab was tilted forward, the cab floor simply lifted away from the subfloor, leaving the entire shifter system behind.

Subfloors have required careful alignment and presented problems in sealing against engine compartment noise, heat and fumes. Also, in order for the shift stick to pass through the opening in the floor when the cab is tilted, the shift knob usually could not be optimally located for driver comfort and ease of use. The large hole required in the cab floor both complicated and weakened the cab structure.

A second previous approach to the problem of tilt-cab vehicles utilized a break-away shift linkage. The shifter control unit was frame-mounted, as with the subfloor approach. The shift lever, however, was attached to the cab under this arrangement. Some means of disengagement of the shift lever from the control unit was provided to permit tilting of the cab.

A break-away shift linkage avoided many of the problems inherent in the subfloor approach, but was not a complete solution. Cab/frame alignment was critical and relative movement could result in large excursions of the shift lever. The break-away detail tended to introduce more lash in the system and reduced shifter "feel". It was usually vulnerable to contamination and tended to require frequent lubrication. As cabs have grown taller, shift towers have had to reach higher and many have had to be supported with extra tie rods and links to attain the necessary stability. All this has tended to add weight and restrict access to the left side of the engine.

U.S. Pat. Nos. 2,854,088 and 3,476,202 show several arrangements providing for pivoting of a shift linkage assembly with the pivot axis of shift linkage components located along the pivot axis of the cab. However, these systems were designed for tilt cabs quite different from those with which the present invention is concerned, and in each case the shift lever was positioned to extend directly down to the proximity of the cab's pivot axis. The type of linkage control motion was different.

It is among the objects of the invention to provide a tilt-cab shift linkage system for a truck of contemporary design, avoiding the problems associated with subfloors and break-away devices. Since reliability is of paramount importance, another object is to avoid complicated or unproven hardware. Push-pull cables, for example, are an obvious but failure prone solution.

Summary of the Invention

The transmission shifter system of the present invention is a unique solution to the tilt-cab shift linkage problem. It avoids the use of a subfloor as well as troublesome "break-away" connections, and constitutes a functional, effective design that utilizes tried and proven components for assured reliability.

The shifter of the invention is as simple in concept as it is effective. A standard shifter control unit mounts directly to the cab. A control shaft extends from an output shaft of the control unit forwardly and downwardly to a point above and behind the cab pivot axis. Through a joint, this drives a transmission linkage shaft which runs rearward to the transmission slave unit. The cab can be tilted with the shifter and transmission in any gear position.

For execution of this concept, two significant problems had to be solved. First, an effective means of transmitting the linear/rotary motion from the control shaft to the transmission linkage shaft had to be devised. Second, in most cab-over-engine trucks the joint between the control shaft and the transmission linkage shaft cannot be located directly along the cab's pivot axis because of obstructing apparatus and structure. Thus, the system of the invention had to allow for the effects of geometry changes during cab tilt.

The solution to the first problem is a specially configured Hooke-type universal joint that can operate in an over-center condition, and with the two joined shafts arranged in an acute angle. While this joint cannot completely revolve, the yokes are configured to provide sufficient rotation for operation of the shifter.

The second problem is solved by placing the special joint, which is the pivot point of the control shaft during cab tilting, close to the cab's pivot axis, and at a selected point above and behind the axis. This minimizes and optimizes the divergence between the arcs of rotation of the control unit about the cab pivot axis and about the special joint. Of course, the divergence has the effect of causing axial translation of the control shaft with respect to the shift control unit and consequent movement of the shift lever. By the positioning of the special joint and the shifter control unit according to the invention, movement of the shift lever during cab tilt is minimized and kept within acceptable patterns and limits.

In another emobodiment of the invention, a different type of shifter control unit is used, one which converts shift lever movements into axial translation only. Multiple output shafts of the control unit are pivotally connected to corresponding control shafts, which in turn are pivotally secured to multiple transmission linkage shafts. Movements of the shift lever are converted through the control unit and the control shafts to fore-and-aft movements of the transmission linkage shafts, which control the transmission. Although this arrangement requires multiple shafts, it avoids the need for universal joints in the system, requiring only pivot joints.

Thus, according to one embodiment of the invention, a gear shift linkage for a cab-over-engine type truck includes a shifter control unit secured to the cab just below the floor. The control unit has an output shaft, and the shift lever has a base pivotally mounted to the control unit, with the control unit being operably connected to receive side to side movement of the shift lever and translate it into rotation of the output shaft, and to accept forward and rearward movement of the shift lever and translate it into generally forward and rearward movement of the output shaft. A transmission linkage shaft is oriented generally horizontally and adapted for operable connection to the truck's transmission, with bearing means connected to the truck frame and mounting the transmission linkage shaft for axial sliding movement and rotational movement to operate the transmission. The linkage includes control shaft means connecting the control unit output shaft with the transmission linkage shaft for transferring rotary and axial movement of the output shaft to the transmission linkage shaft, with first flexible connection means connecting the output shaft to one end of the control shaft and second flexible, pivotal connection means joining the other end of the control shaft with the transmission linkage shaft. The control shaft means and the transmission linkage shaft form a sharply acute angle at the second connection means at the forward ends of the two shaft, and the second connection means is located near the cab pivot axis, whereby, upon forward tilting of the cab, the shift lever undergoes minor changes of position but remains connected in the shift linkage.

DESCRIPTION OF THE DRAWINGS

FIG. 2 is a schematic front elevation view showing a portion of the shift linkage of the invention.

FIG. 3 is a sectional detail view showing a shifter control unit incorporated in the shift linkage.

FIG. 4 is an exploded view showing a specially configured universal joint incorporated in the shift linkage of the invention.

FIG. 5 is a schematic representation, in elevation, illustrating the divergence in arcs of the shifter control unit about two different pivot points, when the system is in a neutral mode.

FIG. 5a is a diagram illustrating the shift lever excursion resulting from the arc divergence shown in FIG. 5.

FIG. 6 is a schematic view similar to FIG. 5 but representing arc divergence when the shift lever is in a rearward gate position.

FIG. 6a is a diagram similar to FIG. 5a but showing shift lever excursion resulting from the arc divergence of FIG. 6.

FIG. 7 is another schematic view similar to FIG. 5, but representing arc divergence when the shift lever is in a forward gate position.

FIG. 7a is another diagram similar to FIG. 5a but showing shift lever excursion resulting from the arc divergence of FIG. 7.

FIG. 10 is a view similar to FIG. 2 showing the modified shift linkage of the second embodiment.

DESCRIPTION OF THE PREFERRED EMBODIMENTS

Figure 1:
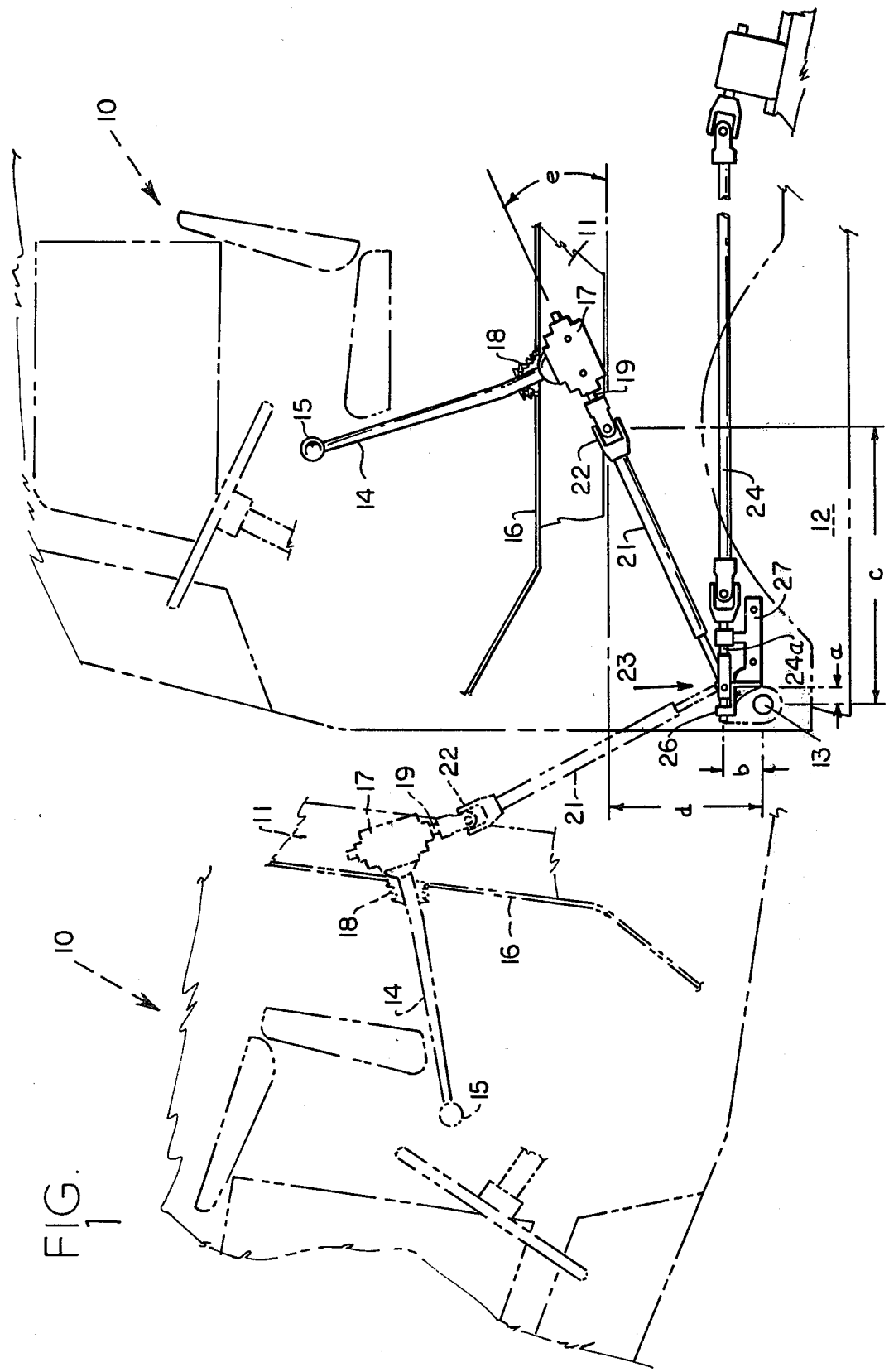
FIG. 1 is a schematic side elevation view, in section, of a cab-over-engine type truck incorporating the shift linkage of the invention, and illustrating the truck cab and the linkage in the normal position and in the position of forward cab tilt.

In the drawings, FIG. 1 shows somewhat schematically, and in dashed lines, a cab-over-engine type truck cab 10 mounted to a frame, a portion of which is shown at 12, on a cab pivot axis 13. Within the cab is a shift lever 14 which passes through the cab floor 16 and is connected into a shifter control unit 17 which may be of conventional design. The lever 14 has a knob or handle 15. The shifter control unit 17 is mounted onto an adjacent cab floor structural member such as the member 11 shown just below the floor 16, and a flexible boot 18 seals out road noise, dirt and fumes from the cab interior in the usual manner.

The shifter control unit 17 has an output shaft 19 which is mounted for both translational and rotational movement, depending upon the movement of the shift lever 14 by the operator. As can be seen from the sectional view of the shifter control unit 17 shown in FIG. 3, forward and rearward movement of the shift lever 14 effects generally fore-and-aft movement of the control unit output shaft 19, whereas side-to-side movement of the shift lever by the driver effects rotational movement of the output shaft.

Most truck transmissions have a shift pattern comprising six shift stick positions or "gates". Each gate may serve for two or three actual gear ratio selections, depending on the condition of a range selector and/or a "splitter" (not shown). These functions are typically controlled by small air valves (not shown) that are attached to the shift lever. The displacement of the shift lever forward or rearward from the neutral position may or may not be the same for each gear position and varies somewhat between transmission models.

The control unit 17, as is typically used on cab-over-engine vehicles, necessarily has some excess motion capability to insure that it will function properly with any transmission or in installations that the control unit manufacturer cannot anticipate. Thus, if unconstrained by connection to the vehicle's transmission, the shift stick 14 would be capable of increased movement, particularly forward and rearward.

As illustrated in FIG. 1, the control unit output shaft 19 is connected to a control shaft 21 by a suitable flexible connection 22 such as a Hooke-type universal joint as shown. The shaft 21 of course accepts both translational and rotational movement. This movement is transferred by the shaft 21 to a specially configured Hooke-type universal joint 23, which is located at the apex of a sharply acute angle formed by the control shaft 21 and a transmission linkage shaft 24. The shaft 24, which extends rearwardly to a transmission (not shown), may be comprised of several shaft components connected by universal joints, as illustrated. Mounting members 26 and 27 are secured to the truck frame and hold the forward portion 24a of the transmission linkage shaft in position with respect to the frame, permitting both axial sliding movement and rotational movement.

As illustrated in FIG. 1, the modified joint 23 between the control shaft 21 and the transmission linkage shaft 24 is not located precisely along the cab pivot axis 13, i.e. the two pivot axes do not coincide. If the axes were coincident for a given shaft lever position, the cab could tilt forward without any relative change of position of the control shaft 21 and the control unit 17, and the position of the shift lever 14 would remain unchanged. However, in most cab-over-engine type vehicles, there are obstructions preventing the location of the joint 23 along the pivot axis 13. Therefore, the axis of the joint 23 is located preferably above and slightly rearward of the pivot axis 13 as indicated. When the truck cab is tilted forward as illustrated in FIG. 1, the effect is to push the control rod 21 toward the control unit 17 to a small extent determined by the divergence in the arcs of movement of the unit 17 about the cab pivot axis 13 and about the pivot point 23′. This causes the shift lever 14 to move during cab tilting, but the movement is not great and it is within limits which are acceptable, due to the placement of the pivot point 23′, and other factors. This shift lever movement and the divergence of arcs will be discussed below with reference to FIG. 5.

FIG. 2 shows in elevational section view, the shift lever 14, the cab floor 16, the shifter control unit 17 and the control shaft 21. The shaft 21 is shown extending downwardly and forwardly to the special joint 23, which is indicated only schematically. The cab pivot axis 13 is shown in dashed lines a short distance below the pivot point at the special joint 23.

The specially configured joint 23, which enables translation and rotation of the control shaft 21 to be transmitted to the transmission linkage shaft 24, is shown in detail in the exploded view of FIG. 4. The frame-secured mounting members 27 and 28 have bearings 29 which provide for rotational and fore-and-aft sliding movement of the forward transmission linkage shaft component 24a. At the forward end of the control shaft 21 is a yoke 31 which engages with a yoke cradle 32 positioned in the shaft component 24a as shown. Both the yoke 31 and the yoke cradle 32 are connected to a motion-transmitting member 33 by rotation-permitting fasteners 34 in essentially the same manner as is typical of a Hooke-type universal joint. However, the difference is that the direction of motion transmission here is not in the same direction as motion is being transmitted by the control shaft 21, as is the usual case of a generally 180° joint, but rather in the reverse direction from the shaft 21, through an angle of generally between about 315° and 360°.

Of course, the yoke cradle 32 on the transmission linkage shaft component 24a is only capable of accepting a limited degree of rotational movement in either direction from the control shaft 21; complete revolution is impossible. The arc of movement accepted, however, is adequate for transmitting the rotational motion required for control of the transmission.

FIGS. 5, 6 and 7, along with FIGS. 5a, 6a and 7a, illustrate considerations regarding the positioning of the special joint 23 with respect to the cab pivot axis 13. Pivot point positions of the special universal joint 23 are indicated at 23a, 23b and 23c.

The point 23a is the maximum forward position of the joint 23, with the shift stick 14 in a rearward gate. The neutral position is at 23b, and the position 23c represents the maximum rearward position of the joint 23, with the shift stick 14 in a forward gate. Similarly, positions of the joint 22 between the control shaft 21 and the control unit output shaft 19 are indicated at 22a, 22b and 22c. FIG. 5 represents the neutral positions 23b and 22b of the two joints for purposes of illustration of the arc divergence for the joint 22 (or for the shifter control unit 17). FIGS. 6 and 7 indicate arc divergence for rearward gate and forward gate shift positions respectively.

As indicated, with the shift mechanism in the neutral position, with forward tilting of the cab the upper pivot point 22b follows a smaller theoretical radius of curvature with respect to the special joint pivot point 23b than with respect to the cab's pivot point 13. The shifter control unit 17 must of course remain on the larger radius of curvature, since it is rigidly positioned with respect to the cab pivot axis 13. The shifter control rod 21 is also rigid, and thus the radius of curvature of the upper pivot point 22b must remain fixed at the smaller value. The result is that the pivot point 22b must move relative to the shifter control unit 17 by an amount equal to the arc divergence shown in FIG. 5. This has the effect of moving the shift lever 14 as the cab is tilted. As illustrated, the degree of divergence varies with cab movement, going from a starting position 35 first, through a portion of divergence in one direction, which causes forward excursion of the shift lever 14 and knob 15, and then through divergence in the opposite direction, causing rearward excursion of the lever and knob. The first position of maximum divergence, denoted 36 in the drawing, corresponds to maximum forward excursion of the shift knob 15. Point 37 is the position at which the arcs coincide again—the shift lever has returned to its starting position. Point 38 is the position of maximum cab tilt and corresponds to the maximum rearward excursion of the shift knob.

FIG. 5 shows that with the shifter in a neutral position the arc divergences at points 36 and 38 are about equal. Thus, the shift stick moves forward and rearward about the neutral position by a similar amount. These movements of the shift knob 15 in neutral position are illustrated diagramatically in corresponding 5a, where the normal neutral position of the knob is shown solid, while the maximum forward excursion 15a and maximum rearward excursion 15b are shown in dashed lines. To the right in FIG. 5a are shown in dashed lines, the normal forward gate position 15f and the normal rearward gate position 15r, and these positions are projected across FIGS. 6a and 7a as well. The reference numbers 36, 37 and 38 show how these shift knob positions correspond to the arc divergencies FIG. 5.

When the shift lever 14 is initially in a rearward gate position there can be less rearward excursion than forward excursion if the travel limits of the control unit are not to be exceeded. The geometry is such that when the shift lever is in a rearward position, the arc relationship changes. As shown in FIG. 6, the divergence is large at point 36′ and small at point 38′. Therefore, the shift lever moves forward a relatively large amount and rearward a relatively small amount, as shown in corresponding FIG. 6a. Since the shift lever was initially in a rearward position, the total envelope of motion stays rather well centered about the nominal neutral position.

The opposite situation occurs when the shifter is initially in a forward position, as illustrated in FIG. 7 and 7a. The arc divergence is less at point 36″ than at point 38″, resulting in the forward excursion of the shift lever being less than the rearward excursion.

In each situation of initial shift position, the forward excursion and the rearward excursion of the shift lever are less than the maximum travel allowed by the control unit 17.

FIG. 1 indicates several variables in dimensional relationships, which depend on a number of factors relating to the particular vehicle in which the shift linkage system of the invention is incorporated, including how close to the cab pivot axis the special joint 23 can be located, the type of control unit 17 used, and the cab configuration and length of the shift lever 14. In one preferred embodiment for a particular truck, the neutral position (shown in FIG. 1) of the joint 23 is at a distance a of about 48 mm behind the cab pivot axis 13 and a distance b of about 94 mm above the axis 13. The universal joint 22 is a distance c or about 718 mm behind the axis 13 and a distance d or about 410 mm above the axis 13. Also under this embodiment the angle e of inclination of the control unit 17 with respect to the horizontal is about 25°, and the design excursion of the special joint 23 from the neutral position is about 12.7 mm forward and 12.7 mm rearward.

Although these values can vary somewhat with different vehicles, their relationships with one another, particularly the ratios of distance above and distance behind the cab's pivot axis, i.e. the angles of displacement of the special joint 23 from the cab axis and of the universal joint 22, are very important. These are selected such that the necessary excursion of the shift lever 14 is divided between forward and rearward motion, with neither being of objectionable magnitude. Even when the shift lever is in an initial forward gate or rearward gate position, the location of the joints is such that further forward movements from the forward gate position is minimal and further rearward movement from the rearward gate position is minimal as illustrated in FIGS. 6a and 7a. This enables the excursion to stay well within the limits of movement of the shifter control unit 17 and to remain within acceptable limits relative to the design of the cab interior. There are other positions in which the special joint 23 can be located, with respect to the cab pivot axis. In addition to the preferred vicinity above and somewhat rearward of the cab pivot axis, the joint 23 could be positioned below and somewhat forward of the pivot axis. In that case, with the joint 23 properly located, the excursion of the shift lever during cab tilt would be first rearward, then forward. Excursion could be kept within acceptable limits. However, this location is not favored because there usually are obstacles to location of a joint 23 below and forward of the cab pivot axis. Generally, the same problems exist that would prevent location of the joint 23 along the cab pivot axis. In addition, the cab pivot axis is usually very close to the front of the cab, so that it may not be possible to locate and mount the joint 23 ahead of the cab's axis.

Figure 8:
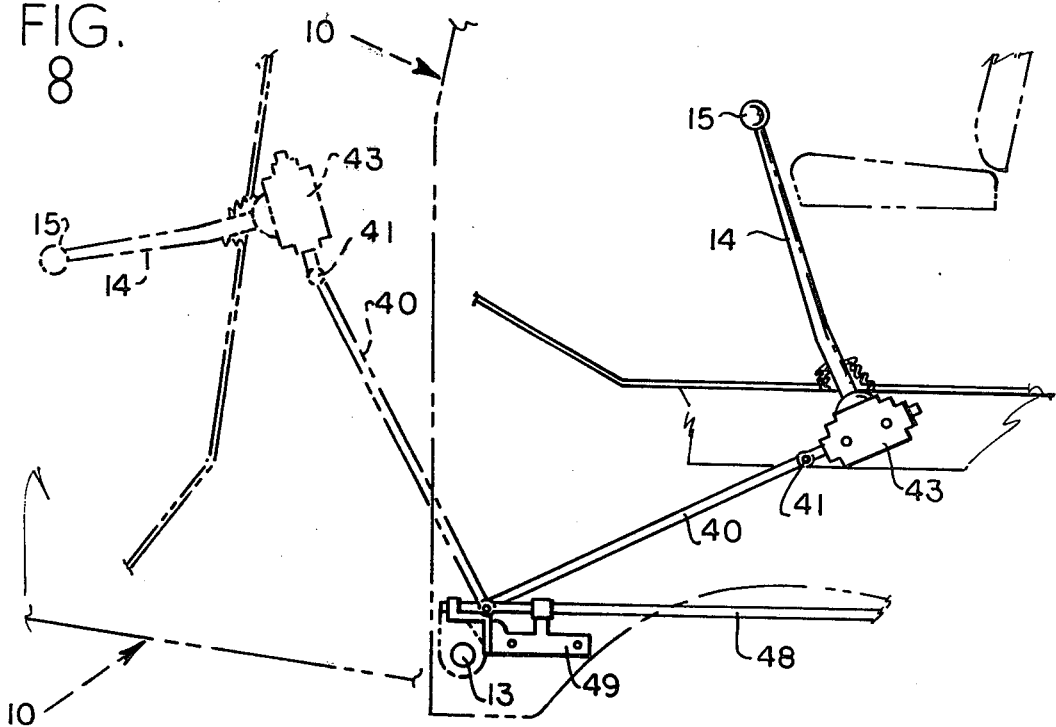
FIG. 8 is a view similar to FIG. 1 but showing a modified form of shift linkage involving only translational links, without rotation.
Figure 9:
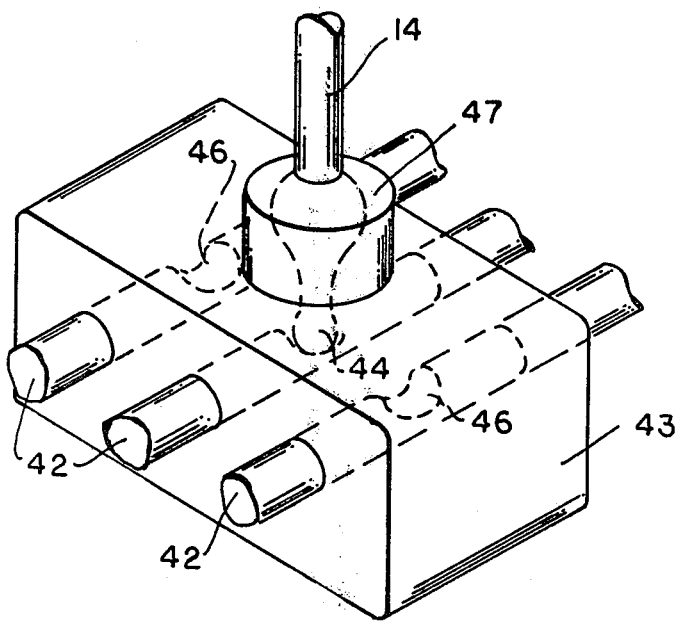
FIG. 9 is a schematic perspective view showing a shifter control unit which may be incorporated in the modified shift linkage of FIG. 8.

FIGS. 8, 9 and 10 illustrate a modified form of shift linkage according to the invention, involving only translational movement of the linkage members, without rotation. As illustrated in FIG. 10, for a transmission having five forward speeds three translational control shafts 40 would be required. These are pivotally connected, at pivot joints 41, to three translational output shafts 42 of a shifter control unit 43 which is different from the unit 17 of the first embodiment, being adapted to accept motions of the shift lever 14 and convert them into forward and rearward movement of the selected output shaft 42. FIG. 9 illustrates the type shifter control unit 43 which may be used. An engaging member 44 connected to and projecting downwardly from the bottom of the shift lever 14 is positioned to engage any one of the three output shafts 42, via concave sockets 46 provided in the upper sides of the shafts as illustrated. The shift lever pivots about a socket member 47, generally similar to the construction shown in FIG. 3 with respect to the shifter control unit 17.

Since rotational movement is not involved in the linkage of the system of FIGS. 8, 9 and 10, only pivotal joints are required for the control shafts 40 and for the corresponding transmission linkage shafts 48 to which they are connected. These are much simpler joints, providing one advantage over the first embodiment; however, three control shafts and transmission linkage shafts are required rather than one, as well as three slide bearing mounting units 49, requiring more space in the truck. Thus, the first embodiment is preferred.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A gear shift linkage for a cab-over-engine type truck having a shift lever extending up through the cab floor, said linkage enabling the forward tilting of the cab on the frame about the cab pivot axis without disengagement of the shift linkage and without dislocation of the shift lever from the cab, comprising:

a shifter control unit secured to the cab just below the floor and having an output shaft, the shift lever having a base pivotally mounted to the control unit, and the control unit being operably connected to receive side-to-side movement of the shift lever and translate it into rotation of the output shaft, and to accept forward and rearward movement of the shift lever and translate it into generally forward and rearward movement of the output shaft;

a transmission linkage shaft oriented generally horizontally and adapted for operable connection to a transmission, and bearing means connected to the truck frame and mounting the transmission linkage shaft for axial sliding movement and rotational movement to operate the transmission;

control shaft means connecting the control unit output shaft with the transmission linkage shaft for transferring rotary and axial movement of the output shaft to the transmission linkage shaft, with first flexible connection means connecting the output shaft to one end of the control shaft and second flexible, pivotal connection means joining the other end of the control shaft with the transmission linkage shaft;

said control shaft means and transmission linkage shaft forming a sharply acute angle at the second connection means at the forward ends of the two shafts; and said connection means being located near the cab pivot axis;

whereby, upon forward tilting of the cab, the shift lever undergoes minor changes of position which depend upon the lever's initial position, but the lever remains connected in the shift linkage.

2. The gear shift linkage of claim 1 wherein the second connection means is located above and somewhat rearward of the cab pivot axis.

3. The gear shift linkage of claim 2 wherein the second connection means is positioned, with respect to the cab pivot axis and with respect to the first flexible connection means, such that when the linkage and transmission are initially in a neutral position, the excursion of the shift lever during cab tilting is first forward and then rearward, approximately equally.

4. The gear shift linkage of claim 2 wherein the second connection means is positioned, with respect to the cab pivot axis and with respect to the first flexible connection means, such that when the shift lever is in a rearward initial position, the excursion of the shift lever during cab tilting is first forward a relatively large distance then rearward a somewhat greater distance to a position just rearward of the initial position.

5. The gear shift linkage of claim 4 wherein the forward pivotal connections are located above and slightly rearward of the cab pivot axis.

6. The gear shift linkage of claim 2 wherein the second connection means is positioned, with respect to the cab pivot axis, and with respect to the first flexible connection means, such that when the shift lever is in a forward initial position, the excursion of the shift lever during cab tilting is first forward a relatively small distance then rearward a much greater distance.

7. The gear shift linkage of claim 2 wherein, in the neutral position, the second connection means is located about 94 mm above and about 48 mm behind the cab pivot axis, and wherein the first connection means is located about 410 mm above and about 718 mm behind the cab pivot axis.

8. The gear shift linkage of claim 7 wherein the second connection means is capable of movement of about 12.7 mm both forward and rearward from the neutral position, when the shift lever is operated.

9. The gear shift linkage at claim 7 wherein the shifter control units output shaft is inclined about 25° from the horizontal in the normal cab position, with the control shaft means aligned with the output shaft in the neutral mode.

10. The gear shift linkage of claim 1 wherein the second connection means comprises a Hooke universal joint type connection having limited rotational movement, less than 180°, with a yoke on the end of the control shaft means and a yoke cradle at the forward end of the transmission linkage shaft, rotatable and axially moveable therewith, said yoke cradle having solid sides and an open central area within which the yoke is angularly positioned, and a motion-transmitting means, on two intersecting axes, connecting the yoke and the yoke cradle.

11. A gear shift linkage for a cab-over-engine type truck having a shift lever extending up through the cab floor, said linkage enabling the forward tilting of the cab on the frame about the cab pivot axis without disengagement of the shift linkage and without dislocation of the shift lever from the cab, comprising:

a shifter control unit mounted to the cab just below the floor and having a plurality of translatable output shafts, the shaft lever having a base pivotally mounted to the control unit, and the control unit being operably connected to selectively engage the output shafts with side-to-side movement of the shift lever and to accept forward and rearward movement of the shift lever and translate it into generally forward and rearward movement of the selected output shaft;

a plurality of transmission linkage shafts oriented generally horizontally and adapted for operable connection to a transmission, and bearing means connected to the truck frame and mounting the transmission linkage shafts for axial sliding movement to operate the transmission;

a plurality of control shafts, one connecting each control unit output shaft with a corresponding transmission linkage shaft for transferring axial movement of the control unit output shafts to the transmission linkage shafts, with pivotal connections on horizontal axes at the forward and the rearward ends of each control shaft, connecting the control shaft to a control unit output shaft at the rearward end and to a transmission linkage shaft at the forward end, permitting relative angular movement of the control shafts with respect to the output shafts and the transmission linkage shafts;

said control shafts and transmission linkage shafts forming an acute angle at the forward pivotal connections of the control shafts; and said forward pivotal connections being located near the cab pivot axis;

whereby, upon forward tilting of the cab, the shift lever undergoes minor changes of position from apparent translation of the control shaft then active, due to nonalignment of the cab pivot axis with the forward pivotal connections, but the shift lever remains connected in the shift linkage.

* * * * *